United States Patent [19]

MacMillan

[11] Patent Number: 5,458,093
[45] Date of Patent: Oct. 17, 1995

[54] GARDEN PROTECTION DEVICE

[76] Inventor: Danny C. MacMillan, 9601 Whitfield Ave., Savannah, Ga. 34106

[21] Appl. No.: 219,438

[22] Filed: Mar. 29, 1994

[51] Int. Cl.⁶ .......................... A01K 15/00; A01K 29/00
[52] U.S. Cl. ............................................. 119/720
[58] Field of Search .................... 119/712, 713, 119/718–720

[56] References Cited

U.S. PATENT DOCUMENTS

| | | | |
|---|---|---|---|
| 3,818,868 | 6/1974 | Boehland, Jr. | 119/23 |
| 4,185,581 | 1/1980 | Tilton | 119/159 X |
| 4,630,571 | 12/1986 | Palmer | 119/712 |
| 5,009,192 | 4/1991 | Burman | 119/719 X |

*Primary Examiner*—Gene Mancene
*Assistant Examiner*—Thomas Price

[57] ABSTRACT

A device for preventing damage to a garden, flower bed, ornamental tree or the like from wandering animals which comprises a water sprinkler head or heads designed to spray water over the area to be protected and activated by a motion sensor which detects intrusion of an animal into such area. The sudden shock of the water spray will drive off the animal without injury and a preset timer will cut off the spray after a brief interval.

5 Claims, 4 Drawing Sheets

5,458,093

GARDEN PROTECTION DEVICE

BACKGROUND OF THE INVENTION

1. Field of the Invention

The present invention relates to a garden protector and more particularly pertains to a device which may be used to scare off animals from an area under protection without damage to such animal.

2. Description of the Prior Art

The use of automatically activated water sprinklers is known in the prior art. More specifically, such devices heretofore devised and utilized for the purpose of automatically turning the sprinkler on are known to consist basically of familiar, expected and obvious structural configurations, notwithstanding the myriad of designs encompassed by the crowded prior art which have been developed for the fulfillment of countless objectives and requirements. Such devices are utilized primarily for watering a lawn or garden at preset times although U.S. Pat. No. 4,253,606 differs in that it turns a sprinkler system on when the humidity in the soil reaches a predetermined low point. Other devices operating off timers are shown in U.S. Pat. Nos. 5,074,468; 3,865,138; 3,669,352; and 3,599,669.

In this respect, the device according to the present invention substantially departs from the conventional concepts and designs of the prior art, and in so doing provides an apparatus primarily developed for the purpose of turning a sprinkler on only when the need to scare off an intruder in a protected area exists. Such a device eliminates danger of injury to a child or animal such as may occur when other types of devices such as electric fences are used for area protection.

Therefore, it can be appreciated that there exists a continuing need for new and improved sprinklers which can be used as protective devices. In this regard, the present invention substantially fulfills this need.

SUMMARY OF THE INVENTION

In view of the foregoing disadvantages inherent in the known types of protective devices now present in the prior art, the present invention provides an improved construction wherein the same can be utilized to safely protect a garden against animal intrusion. As such, the general purpose of the present invention, which will be described subsequently in greater detail, is to provide a new and improved garden protection apparatus which has all the advantages of the prior art devices and none of the disadvantages.

To attain this, the present invention essentially relates to a device for preventing damage to a garden, flower bed, ornamental tree or the like from wandering animals which comprises a water sprinkler head or heads designed to spray water over the area to be protected and activated by a motion sensor which detects intrusion of an animal into such area. The sudden shock of the water spray will drive off the animal without injury and a preset timer will cut off the spray after a brief interval.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved garden protection device which has all the advantages of the prior art devices and none of the disadvantages.

It is another object of the present invention to provide a new and improved garden protection device which may be easily and efficiently manufactured and marketed.

It is a further object of the present invention to provide a new and improved garden protection device which is of a durable and reliable construction.

An even further object of the present invention is to provide a new and improved garden protection device which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved garden protection device which provides in the apparatuses and methods of the prior art some of the advantages thereof, while simultaneously overcoming some of the disadvantages normally associated therewith.

Still another object of the present invention is to provide a new and improved garden protection device which will scare off intruding animals.

Yet another object of the present invention is to provide a new and improved garden protection device which will not cause injury to animals yet will deter them from remaining within the area protected by such device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
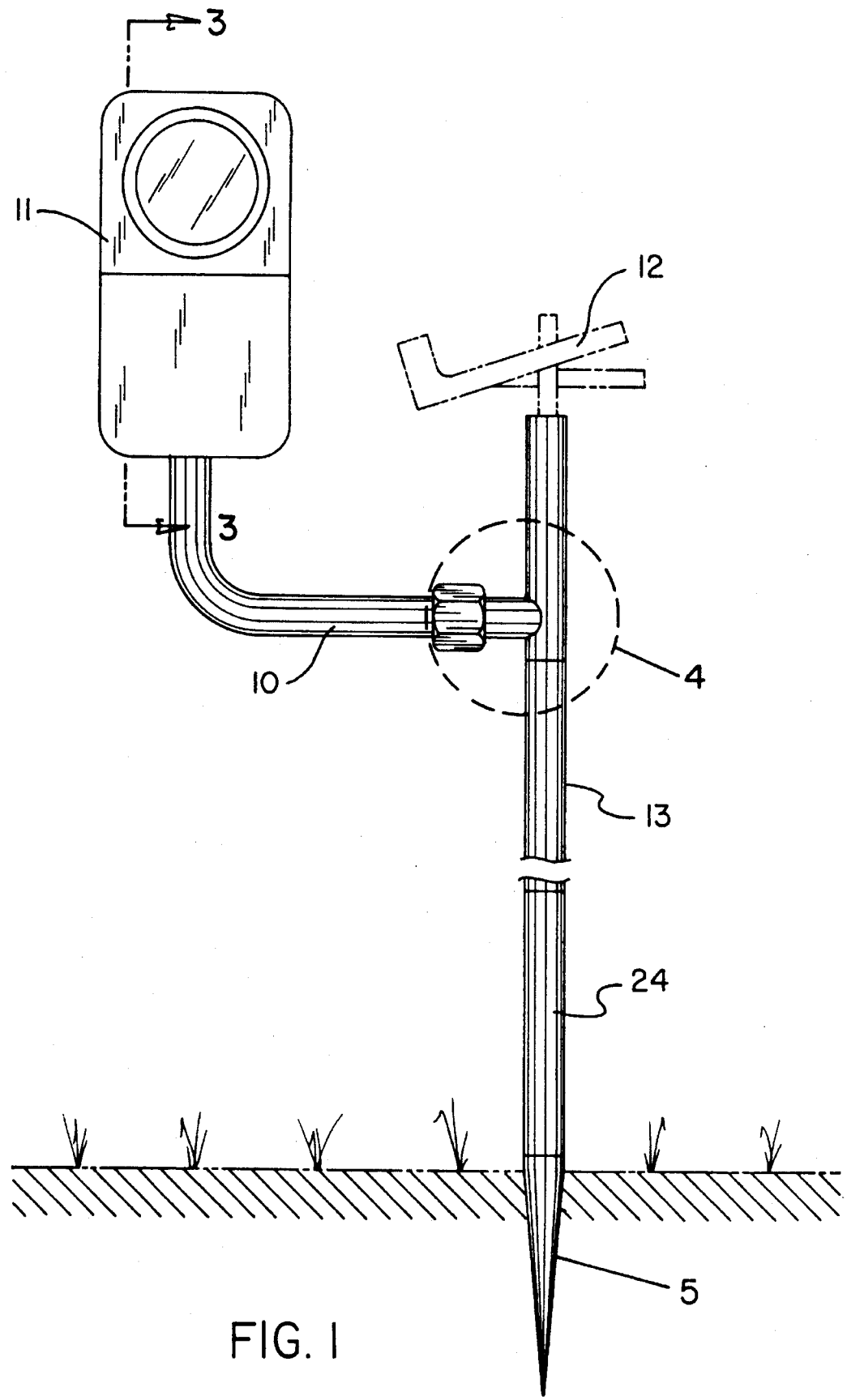
FIG. 1 is a front plan view of the device of the present invention.
Figure 2:
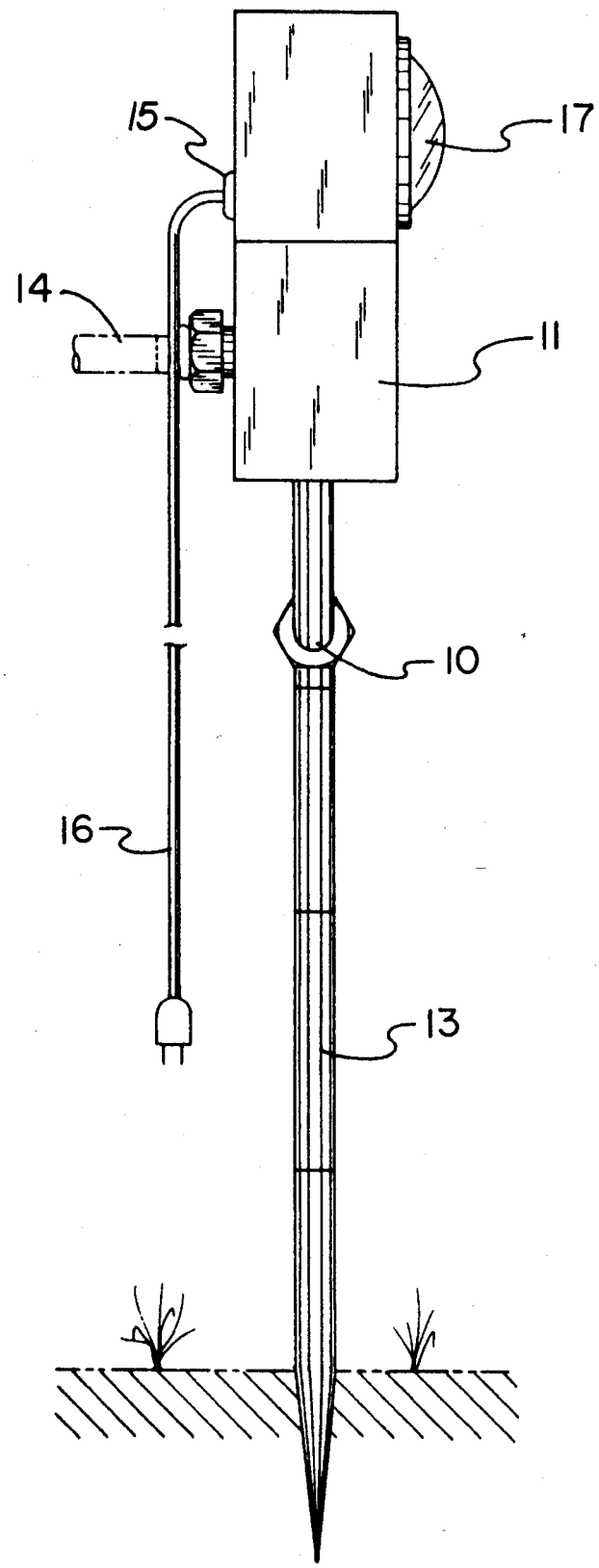
FIG. 2 is a side plan view of the device of FIG. 1.

With reference now to the drawings, and in particular to FIGS. 1 and 2 thereof, a new and improved garden protection device embodying the principles and concepts of the present invention and generally designated by the reference numeral 10 will be described.

More specifically, it will be noted that the unit 10 essentially consists of a control head 11; a conventional sprinkler head of either the fixed or rotary type 12 having an adjustable area spray (shown in broken lines); a mounting post 13 for the control and sprinkler heads; and a garden hose 14 (shown in FIG. 2 in broken lines) for introducing water into a fitting on control head 11. A 110 volt power cord connection 15 for control head 11 (also shown in FIG. 2) is required as explained in connection with FIG. 3.

Figure 3:
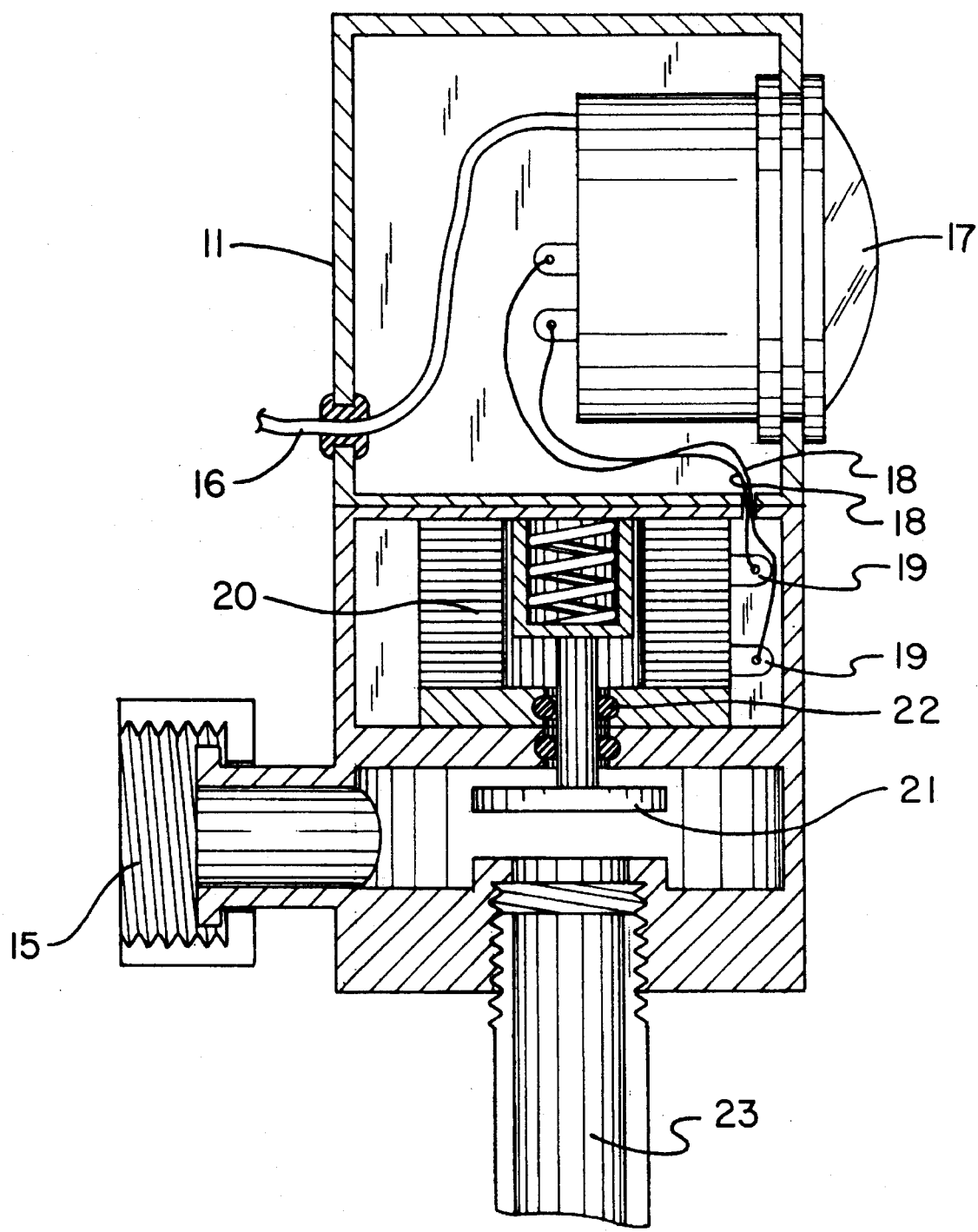
FIG. 3 is a sectional view on line 3—3 of FIG. 1.

Referring now to FIG. 3, a sectional view of the control head 11 is shown. The actuating element for the sprinkler head 12 is a motion detecting sensor 17 mounted in the upper portion of control head 11. Mounted within sensor 17 is a conventional timer (not shown) which will deactivate the sensor 17 after a short interval, e.g. two or three minutes. The sensor 17 is connected to a conventional plug-in power source by power cord 16. Running from sensor 17 are a pair of electrical wires 18 connected to the terminals 19 of a solenoid valve unit 20. The spring loaded plunger 21 of solenoid valve 20 runs through a pair of seals 22 protecting the solenoid unit 20 from contact with water fed into the control head 11 through fitting 15 from the hose shown in FIG. 2. Shown in its open or actuated position in this FIG. 3, with the plunger 21 retracted, water from fitting 15 flows into the control head 11 and out through an outlet conduit 23 to sprinkler head 12. When the timer operates, plunger 21 drops and engages with the inlet end of conduit 23 closing off water flow to such sprinkler head 12 until the next time sensor 17 is activated and in turn activates the solenoid unit 20.

Figures 4, 5:
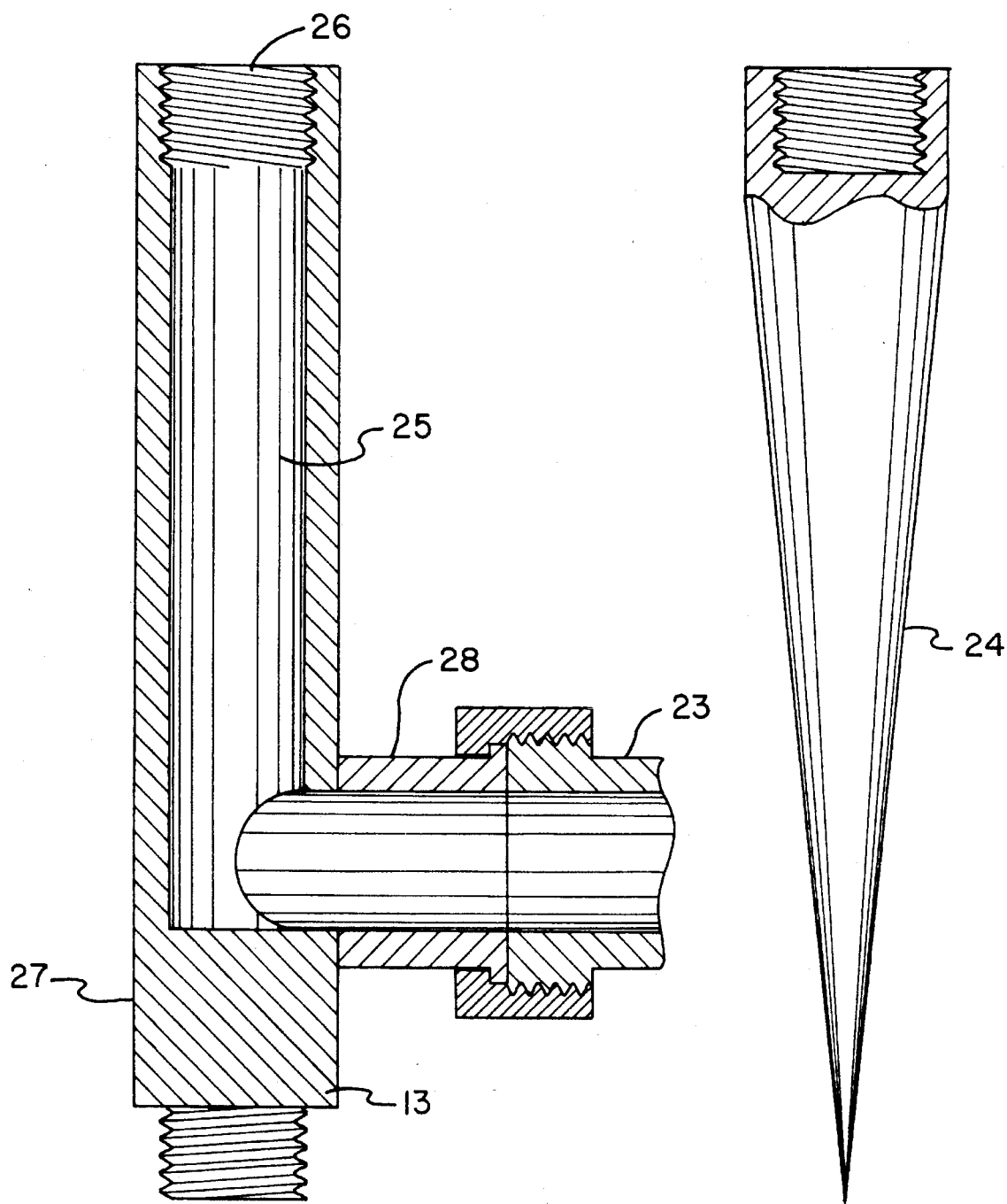
FIG. 4 is a sectional view of the area indicated as "4" on the drawing of FIG. 1.
FIG. 5 is a sectional view of the pointed bottom end of the device of FIG. 1.

FIG. 4 illustrates in a sectional view the connection of outlet conduit 23 to the support or mounting post 13. Preferably post 13 is composed of threaded segments which may be increased or decreased in number to adjust the above ground height of the sprinkler head 12. The upper segment 27, as shown in FIG. 4 has a conduit 25 therein, open at its upper end 26 where it threadably connects to sprinkler head 12 (not shown in this view) and closed by a plug at its lower end where it connects with the lower segment section 24. The conduit 25 has a threaded connection 28 extending from and open to conduit 25 for connection with the outlet conduit 23 from the control head 11. When the solenoid unit in head 11 opens, water flows through outlet conduit 23 into conduit 25 and thence to sprinkler head 12.

FIG. 5 illustrates the lower segment section 24 having a pointed ground penetrating end portion for post 13. As mentioned above, the number and/or length of intermediate segments may vary depending upon the above ground height desired for sprinkler head 12.

Preferably, the support post 13 and conduits associated therewith are made of high impact plastic material as is the housing for control head 11. The lowest segment section 24 of post 13 may be made of steel to give greater strength to its pointed end if desired.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved device for protecting a garden from wandering animals which comprises: a sprinkler head; a water supply for said sprinkler head; a solenoid valve controlling flow from said water supply to said sprinkler head; and a motion sensor connected to said solenoid valve to activate and deactivate said solenoid valve upon the presence or absence of animals within range of said motion sensor; said sprinkler head is mounted on an adjustable height support post having its lower end embedded in the ground; said solenoid and said motion sensor are contained within a surrounding housing which is fixedly secured to said support post and said housing spaced from the lower end.

2. A device as in claim 1 wherein said motion sensor contains a timer to deactivate the solenoid valve connected thereto after a brief period of operation.

3. A device as in claim 1 wherein said sprinkler head, said solenoid valve and said motion sensor are mounted on a support post formed of a plurality of threaded segments joined one to another.

4. A device as in claim 1 wherein the uppermost of said segments contains a water transmitting conduit in communication with an outlet from said solenoid valve.

5. A device as in claim 1 wherein the lowermost of said segments has a pointed-penetrating end thereon.

* * * * *